Patented June 3, 1952

2,599,431

UNITED STATES PATENT OFFICE 2,599,431

FRUIT JUICE BLEND AND METHOD OF PRODUCING SAME

John A. Bruce, Tampa, Fla., assignor to Prime Products Inc., Tampa, Fla., a corporation of Florida No Drawing. Application July 25, 1949, Serial No. 106,750

8 Claims. (Cl. 99—105)

This invention relates to a fruit juice blend of pineapple juice and grapefruit juice and is directed to improvements upon the blended juice product and method described and claimed in copending James L. Parker application Serial No. 77,670, filed February 21, 1949, and a characterizing feature of which is that the skin juice as well as the meat juice of pineapple are extracted and combined with grapefruit juice.

Pineapple juice can be produced most economically by extraction from the skin-containing whole pineapple fruit. However, the juice thus obtained is objectionable as a beverage because of the presence of juice extracted from the skin which contains bitter components which impart an undesirable flavor which is unpleasing to taste. The juice is unpalatable even though pressing or other conventional extraction procedures yield only a limited amount of the available skin juice and the main juice is obtained from the pineapple meat. For the reasons mentioned present commercial practice is preliminarily to remove the skin or rind from the pineapple and to extract juice solely from the pineapple meat. Such juice is pleasing to the taste and of a noticeably different flavor due to the absence of the skin juice. An example of the latter procedure is found in Hoyt and Botley Patent 2,045,856, granted June 30, 1936.

While pineapple juice extracted from the skin-containing whole fruit is undesirable as a beverage such a juice forms a superior beverage in blend with the juice of citrus fruit. In such a blend the juice extracted from the pineapple skin which is objectionable from a taste standpoint in an unblended pineapple juice definitely enhances the blend. The pineapple skin juice contains delicate essences of desirable flavor as well as bitter components. Such essences are most pleasing in the blend. Yet the bitter components are unnoticeable because they are selectively suppressed by the citrus juice. The blend is more pleasing to the taste than a blend of citrus juice with pineapple juice lacking the skin juice. Accordingly, the term "pineapple juice" is employed for convenience hereafter to collectively denote both the meat juice and the skin juice of pineapple.

A primary object of the invention is to provide a blend of pineapple and grapefruit juices of superior flavor and palatability.

An equally important object of the invention is to secure at all times uniformity of flavor and palatability in a blend of pineapple and grapefruit juices despite normal variations in the quality of pineapple and grapefruit with seasonal and other conditions.

A further object of the invention is to standardize flavor of a blend of pineapple and grapefruit juices by controlling particular flavor-influencing characteristics of the juices.

A further object of the invention is to standardize the flavor of a blend of pineapple and grapefruit juices by controlling the values of particular flavor-influencing characteristics, proportioning the amounts of the individual juices towards obtaining such characteristics in the blend so far as possible and, where necessary, to adjust the blend to obtain the characteristics by the use of one or more suitable additives.

The quality of pineapple and grapefruit varies at different times of the growing season and with different growing conditions. Consequently the flavor intensity, sweetness and acidity of the fruit juices vary. The flavor intensity may vary from strong to weak. The sweetness of both juices likewise varies and is frequently below 14° as measured on the Brix specific gravity scale. The acidity of pineapple juice varies from approximately 0.6% to 0.9% and that of grapefruit juice from approximately 0.9% to 1.5%.

Because of the factors just referred to it is difficult to obtain a blend of pineapple and grapefruit juice of superior flavor and to maintain such flavor uniform at all times of the canning season. I have discovered, however, that such objectives may be obtained by controlling the values of specific flavor-influencing characteristics of the juices within narrow limits. In particular, I have found the highest point of flavor and palatability can be obtained when the Brix specific gravity value of the blend is about 14.6° or at least within the narrow range of 14° to 15° and the acidity of the blend about 0.74% or at least within the narrow range of 0.72% to 0.76%.

I have further found that the flavor values just referred to can sometimes be obtained solely through proper proportioning of the pineapple juice and grapefruit juice to each other. Ordinarily, however, one or both of such flavor values will be outside of the ranges specified and must be adjusted. The Brix scale value is usually too low and can be adjusted by the addition of a sweetening agent such as sugar, dextrose, or both. The acidity also is usually at least slightly too high but may be adjusted by adding an edible alkali agent. Soluble inorganic calcium and sodium derivatives are preferred, such as calcium carbonate and sodium hydroxide.

Under average conditions blends of 40% to

50% pineapple juice and 60% to 50% grapefruit juice are employed but because of the fruit quality variations above referred to the pineapple juice may vary from as low as 30% to as high as 70%.

The relative flavor intensity of the grapefruit and pineapple juice will be the main factor in determining the proportions since the sweetness and acidity can be readily adjusted, where necessary, as before explained.

Preparatory to processing lots of pineapple and grapefruit preliminary samples of their juices are obtained and checked for flavor characteristics. Such samples are then combined and the proportions adjusted until the blend has attained or approximates as far as possible the desired peak of flavor and palatability. The relative proportions are then noted and the Brix scale value and acidity checked. If either or both of such values are beyond the narrow range limits previously specified appropriate amounts of a sweetening agent and an edible alkali are added and the amounts thereof in proportion to the amount of sample blend are noted. Processing of the fruit lots in accordance with the information obtained from the test blend can then be carried out with the assurance that the blend will have superior flavor and palatability which will be uniform with those characteristics of fruit lots previously processed or thereafter to be processed.

The processing of pineapple to extract the meat and skin juices and of grapefruit to extract the juice and the blending of such juices is accomplished as set forth in the previously mentioned Parker application Ser. No. 77,670 and now to be explained.

Decrowned pineapple containing their skins are reduced to small pieces by a cutting operation to facilitate juice extraction in a food chopper or slicer. The pieces of meat are then subjected to an extracting operation under pressure which reduces the meat and releases considerable of the juice therefrom. A battery of conventional screw presses is very satisfactory for extraction but other conventional types of fruit juice extracting presses may also be employed.

The next stage is a finishing operation in which the main amount of pineapple meat juice is removed from the meat and skin pulp. A conventional fruit juice finisher machine of the type employing a rotary screw with surrounding screen, commonly employed in tomato juice production, is recommended, but other conventional types of finisher machines can also be used. The screened meat juice, containing only a negligible amount of the skin juice is collected for subsequent blending.

Grapefruit juice is extracted from grapefruit in a conventional burr-type or other conventional citrus fruit juice extractor. The grapefruit juice and pulp are collected and the peel eliminated, the juice and pulp are then subjected to a finishing operation in a conventional finishing machine such as heretofore described.

To recover the skin juice from the pineapple the skin and other pineapple pulp from the earlier described finishing operation are combined with the grapefruit pulp and juice in the finishing operation thereon. The further squeezing in such operation of the pineapple skin in the presence of the substantial body of grapefruit juice being produced simultaneously causes the skin juice to be washed out of the pineapple skin. Such skin juice with any further amount of pineapple juice recovered from the pineapple pulp is removed in admixture with the grapefruit juice while the combined grapefruit and pineapple pulps are removed as waste. The mixed juices are now ready for blending with the main body of pineapple meat juice recovered in the first finishing operation. Blending is accomplished in any suitable tank in the proportions above referred to. As earlier stated blending is carried out to obtain the Brix specific gravity value within the range of 14° to 15° and an acidity within the range of 0.72% to 0.76%, if necessary with the addition of a sweetening agent and/or an edible alkali agent as earlier explained.

The juice blend is further processed in any of the ways conventionally employed with an unblended fruit juice. For merchandizing as a canned juice the juice blend is deaerated, flash pasteurized at a temperature of 190 to 200° F., canned and immediately cooled. The juice blend also may be concentrated through conventional technique and/or frozen under known quick freezing procedure.

I claim:

1. A juice blend comprising the meat juice and the skin juice of pineapple and grapefruit juice, the ratio of the pineapple juices to the grapefruit juice being within the range of 3:7 to 7:3, the blend having an acidity within the range of 0.72% to 0.76% and having a Brix scale specific gravity value within the range of 14° to 15°.

2. A juice blend comprising the meat juice and the skin juice of pineapple blends with grapefruit juice, the ratio of the pineapple juices to the grapefruit juice being within the range of 3:7 and 7:3, and further including an added edible alkali in amount to bring the acidity of the blend within the range of 0.72% to 0.76%, the blend having a Brix scale specific gravity value within the range of 14° to 15°.

3. A juice blend comprising the meat juice and the skin juice of pineapple blended with grapefruit juice, the ratio of the pineapple juices to the grapefruit juice being within the range of 3:7 and 7:3, and further including an added sweetening agent in amount to bring the Brix scale specific gravity value of the blend within the range of 14° to 15°, the blend having an acidity within the range of 0.72% to 0.76%.

4. A juice blend comprising the meat juice and the skin juice of pineapple blended with grapefruit juice, the ratio of the pineapple juices to the grapefruit juice being within the range of 3:7 to 7:3, said blend further including an added edible alkali in amount to bring the acidity of the blend within the range of 0.72% to 0.76% and an added sweetening agent in amount to bring the Brix scale specific gravity value of the blend within the range of 14° to 15°.

5. A method of making a pineapple juice and grapefruit juice blend to secure uniformity of selected flavor which comprises blending the meat juice and the skin juice of pineapples with grapefruit juice in proportions balanced to approximate the selected flavor and securing the selected flavor by adjusting the Brix scale specific gravity value of the blend within the range of 14° to 15° and adjusting the acidity of the blend within the range of 0.72% to 0.76%.

6. A method of making a pineapple juice and grapefruit juice blend to secure uniformity of selected flavor which comprises blending the meat juice and the skin juice of pineapple with grapefruit juice in balanced proportions to at least approximate the selected flavor and bringing the blend to a Brix scale specific gravity value within the range of 14° to 15° and an acidity within the range of 0.72% to 0.76%, sweetening and edible alkali agents being added to whatever amount of either or both is required to secure said specific gravity and acidity values.

7. A method of making a pineapple juice and grapefruit juice blend to secure uniformity of selected flavor which comprises preliminary testing the flavor characteristics of samples of meat and skin juices of pineapple and grapefruit juice extracted from the lots of pineapple and grapefruit to be used and preparing a sample blend of said sample juices, the proportions of the juices of the two fruits being adjusted until the selected flavor is approached as closely as possible by the natural sweetness and acid characteristics of the juices, adjusting the sample blend to a Brix scale specific gravity value within the range of 14° to 15° by the addition of the required amount of sweetening agent and adjusting the sample blend to an acidity within the range of 0.72% to 0.76% by the addition of the required amount of an edible alkali, then processing fruits from the lots in quantity to extract and blend the juices therefrom in the proportions determined from the sample blend and adding the required amounts of sweetening agent and edible alkali determined from the sample blend to secure said specific gravity and acid values.

8. A juice blend comprising the meat juice and the skin juice of pineapple and grapefruit juice, the ratio of the pineapple juices to the grapefruit juice being within the range of 3:7 and 7:3, the blend having an acidity of about 0.74% and having a Brix scale specific gravity value of about 14.6%.

JOHN A. BRUCE.

REFERENCES CITED

The following references are of record in the file of this patent:

UNITED STATES PATENTS

| Number | Name | Date |
|---|---|---|
| 1,166,674 | Gould et al. | Jan. 4, 1916 |
| 1,362,868 | Johnson | Dec. 21, 1920 |
| 1,735,118 | Kunz | Nov. 12, 1929 |
| 2,045,856 | Hoyt et al. | June 30, 1936 |
| 2,143,642 | Bias | Jan. 10, 1939 |

OTHER REFERENCES

"Everybody's Cook Book," 1937, by I. E. Lord, published by Harcourt, Brace and Company, New York, pages 68, 69, 70 and 71.